Aug. 5, 1952     M. P. WINTHER     2,605,651
VARIABLE-SPEED TRANSMISSION GEAR
Filed May 19, 1947     3 Sheets-Sheet 1

Martin P. Winther,
Inventor.
Haynes and Koenig
Attorneys.

Aug. 5, 1952 M. P. WINTHER 2,605,651
VARIABLE-SPEED TRANSMISSION GEAR
Filed May 19, 1947 3 Sheets-Sheet 2

Martin P. Winther,
Inventor.
Haynes and Koenig,
Attorneys.

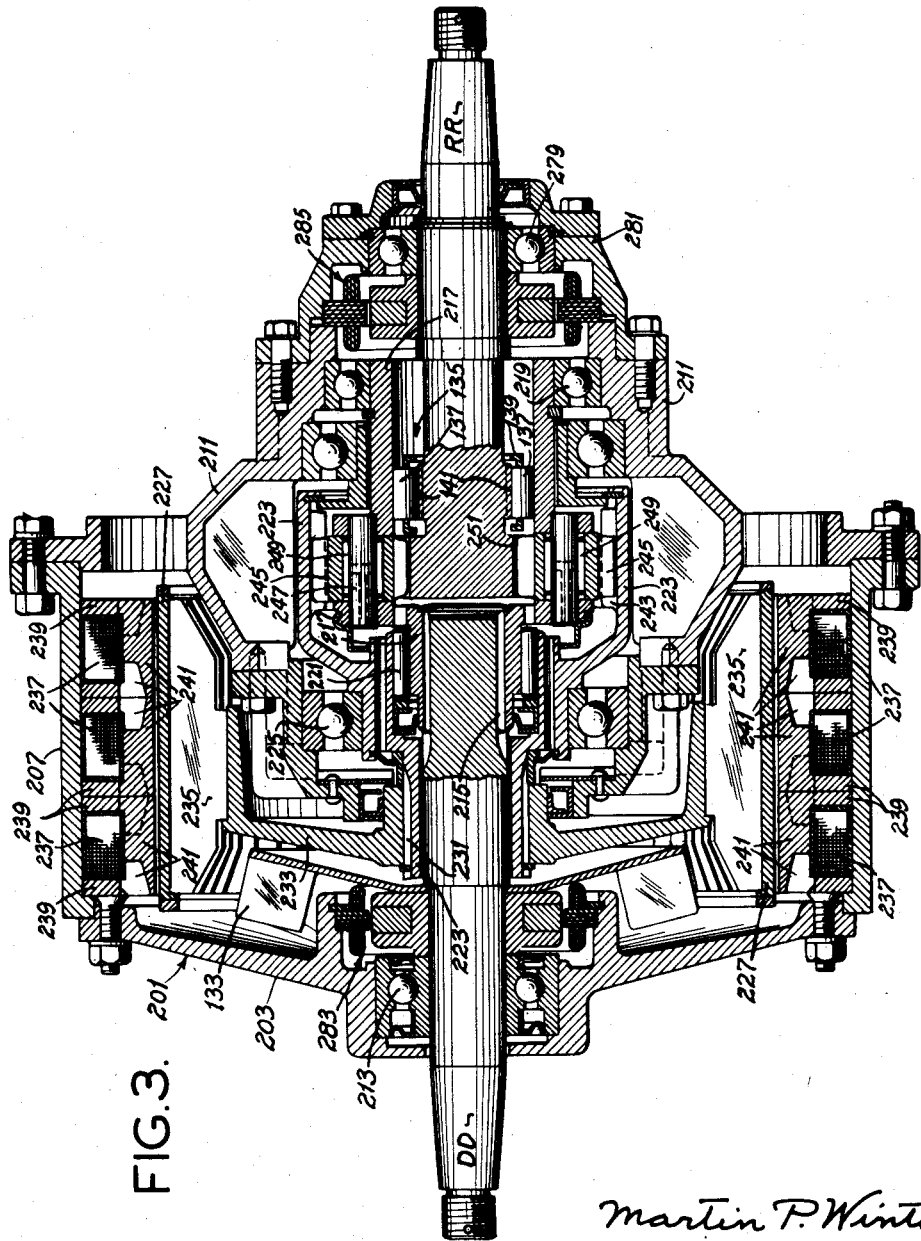

Patented Aug. 5, 1952

2,605,651

UNITED STATES PATENT OFFICE 2,605,651

VARIABLE-SPEED TRANSMISSION GEAR

Martin P. Winther, Waukegan, Ill., assignor to Martin P. Winther, as trustee

Application May 19, 1947, Serial No. 748,919

11 Claims. (Cl. 74—752)

This invention relates to variable-speed transmission gears, and with regard to certain more specific features, to such gears for drives requiring adaptations of variable-speed driving apparatus to driven apparatus which is less adaptable to variable speeds.

Among the several objects of the invention may be noted the provision of means for effecting a driving connection between a variable-speed driver and a driven member which latter should be operated close to a given speed and not over said speed for long periods; the provision of apparatus of the class described which provides for direct or a gearless connection at a normal high speed of the driving member and for an over-speed or overdrive geared connection at temporary low speeds of the driving member; the provision of apparatus of the class described providing for a quick transfer between the direct-drive and overdrive conditions with governing action upon a driven member under either direct-drive or overdrive conditions; and the provision of apparatus of this class which is economical to make, simple, compact and trouble-proof. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 3 is a longitudinal section showing another form of the invention; and,

Similar reference characters indicate corresponding parts throughout the several views of the drawings.

The conditions met by the present invention occur under various circumstances, for example in a vehicle compressor drive. Vehicles such as transport trucks carry compressors or pumps serving refrigerators, hydraulic steering circuits and the like. Compressors of this type should be operated near to their designed speeds but should not be operated above these for long. It is desirable that a compressor of this type be operated by means of a power take-off drive from the vehicle engine which of course means that the take-off drive will operate at variable speeds. It follows that if a transmission has a speed ratio high enough to drive the compressor at the proper compressor speed under low vehicle and engine idling speeds, then the compressor will be over-speeded at normal road speeds of the vehicle. Conversely, if the transmission has a speed ratio which is low enough properly to drive the compressor at vehicle road speeds, then it is not high enough to drive the compressor at a proper speed at low road speeds or when the engine is idling. Furthermore, under the above conditions there is no compressor regulation.

Thus the present invention allows a compressor or the like to be driven at or near optimum speeds at various speeds of the driving member, with proper compressor regulation, by effecting a direct drive under relatively high speeds of the driving member and an overdrive at relatively low speeds of the driving member, with electromagnetic regulating controls.

Figure 1:
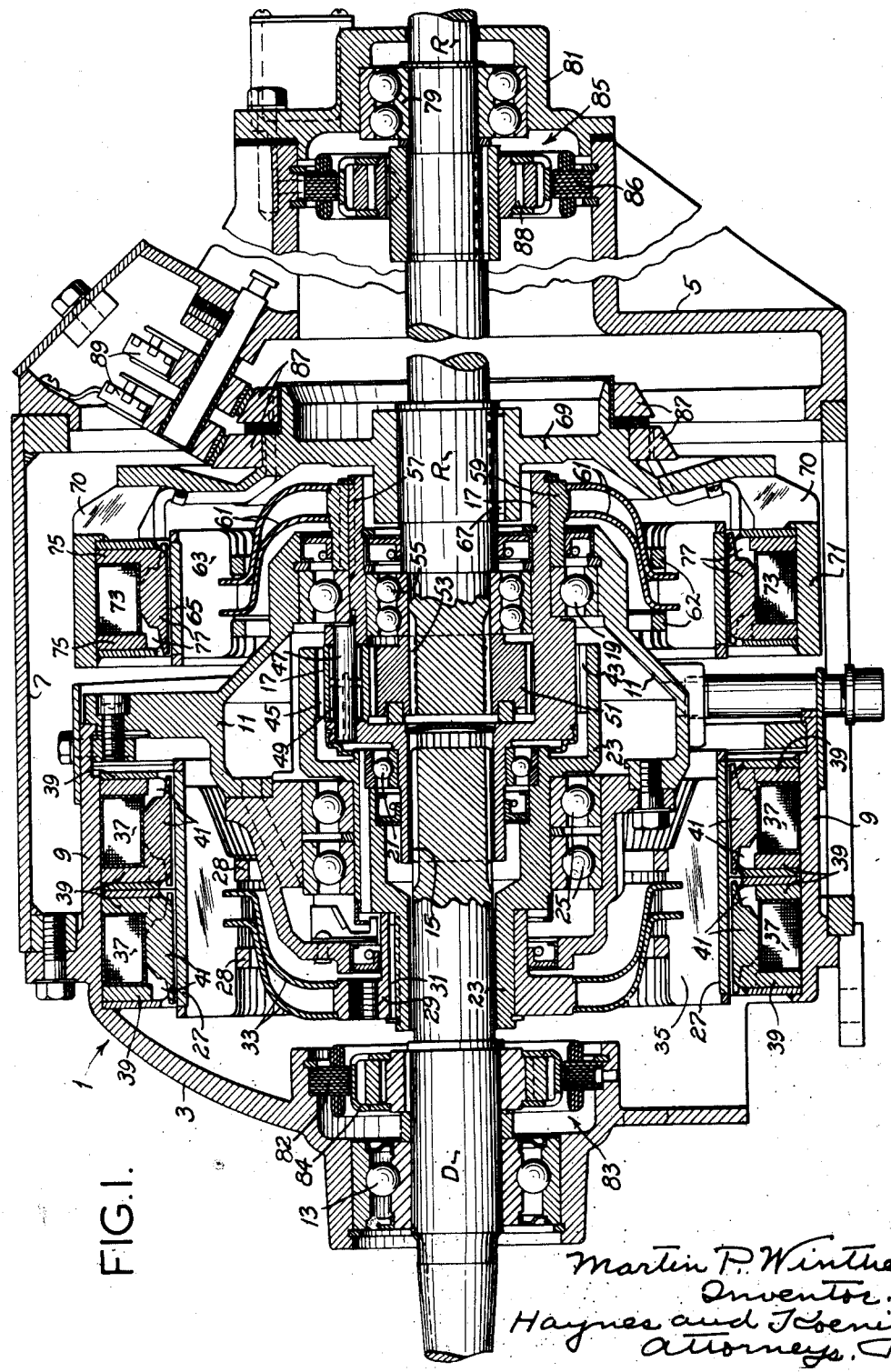
Fig. 1 is a longitudinal section showing one form of the invention.

Referring now more particularly to Fig. 1, there is shown at numeral 1 a casing comprising a left end bell 3, a right end member 5 and a cover 7. The left end bell 3 has a sleeve 9 extending some distance into the machine. On the inner end of the sleeve is bolted a fixed hollow supporting assembly 11. A bearing 13 at the left in the bell 3 supports a variable-speed drive shaft D which is driven from the variable-speed prime mover (not shown). This shaft D extends into the assembly 11 where, by means of splines 15, it is connected with a rotary epicyclic cage, carrier or planetary arm 17, the latter being carried upon bearings 19 in the assembly 11 and also upon bearings 21 in an annular member 23. The member 23 is supported upon bearings 25 in said assembly 11. At its left end the annular member 23 carries a magnetic inductor drum or ring 27. The support for the drum 27 on the member 23 comprises a hub 29 keyed to the member 23 at 31. On the hub 29 are supported dished discs 33. These in turn support radial webs 35, the latter forming the immediate peripheral support for the inductor drum 27. Rings 28 act as stiffeners.

Mounted within the fixed sleeve 9 (which is magnetic) are annular field coils 37 on opposite sides of which are located magnetic rings 39. Each ring 39 carries peripherally spaced teeth 41. The teeth 41 on one ring stagger with respect to oppositely directed teeth on the opposite ring, thereby making an interdigitated tooth pole structure between each coil 37 and the inductor ring 27. A small running clearance is maintained between the inner faces of the teeth 41 and the inductor ring 27 which forms a magnetic gap. If the coils 37 are energized, toroidal flux fields are engendered around them which enter the inductor 27 through the pole-forming teeth 41. Hence if the inductor 27 be rotated with respect to this field, eddy currents will be engendered therein to provide a reactive flux which acts as an electromagnetic brake for the inductor member 27 and hence as a retarder brake for the annular member 23. The amount of slip of the inductor member 27 during retarding action depends upon the excitation in the coils 37, slip decreasing with increased excitation.

At its right-hand end the annular member 23 carries an annular or internal gear 43 which meshes with planetary gears 45. The planetary gears 45 have rotary needle bearing supports upon pins 47 carried by rotary cage 17. Only one gear 45 is shown, because the section passes through only one, but there are two other identical gears 45 in other sections at 120° relative to the section shown. The needle bearings for one of the gears 45 on one pin 47 are shown at 49.

The planetary gears 45 also mesh with a central pinion or sun gear 51 keyed at 53 to the driven shaft R, the latter being coupled at the right to the apparatus to be driven, such as, for example, a pump. Bearings 55 provide for alignment between the shaft and the cage 17.

At its right-hand end the rotary cage 17 is keyed at 57 to a hub 59, the latter carrying dished discs 61 similar to the dished discs 33 already mentioned. These discs 61 support radial webs 63 and stiffening rings 62, similar to the webs 35, and stiffening rings 28 already mentioned. The webs 63 support a second magnetic inductor drum or ring 65 similar to the drum 27 except that it is shorter.

The driven shaft R is keyed at 67 to spider 69 which it rotates. The right-hand end of shaft R is supported in bearings 79 in a cap 81 on the end member 5. The spider on webs 70 carries a magnetic rim 71 within which is positioned an annular field coil 73. The webs 70 act as air circulators. On opposite ends of this coil are magnetic rings 75 similar to the rings 39 and having peripherally spaced and staggered interdigitated teeth 77 similar to the teeth 41 already described. Thus by exciting the coil 73, an electromagnetic driving slip coupling or clutch is established between the inductor drum 65 and the spider 69, the latter driving the shaft R.

The drive shaft D drives a small permanent magnet A. C. generator 83, the stator 82 of which is mounted upon the bell 3 and the armature 84 of which is carried by the driving shaft D.

Driven from the driven shaft R is a small permanent magnet A. C. generator 85, the stator 86 of which is carried upon the stationary member 5 and the rotor 88 of which is keyed to the driven shaft R. These generators 83 and 85 will be discussed below in connection with the wiring diagram of Fig. 2.

No slip rings are required to excite the stationary coils 37, but merely fixed wiring as will appear. On the other hand, the rotary coil 73 requires slip rings, and such are shown at 87, being carried upon the spider 69. Feed brushes 89 are shown for the slip rings 87.

Figure 2:
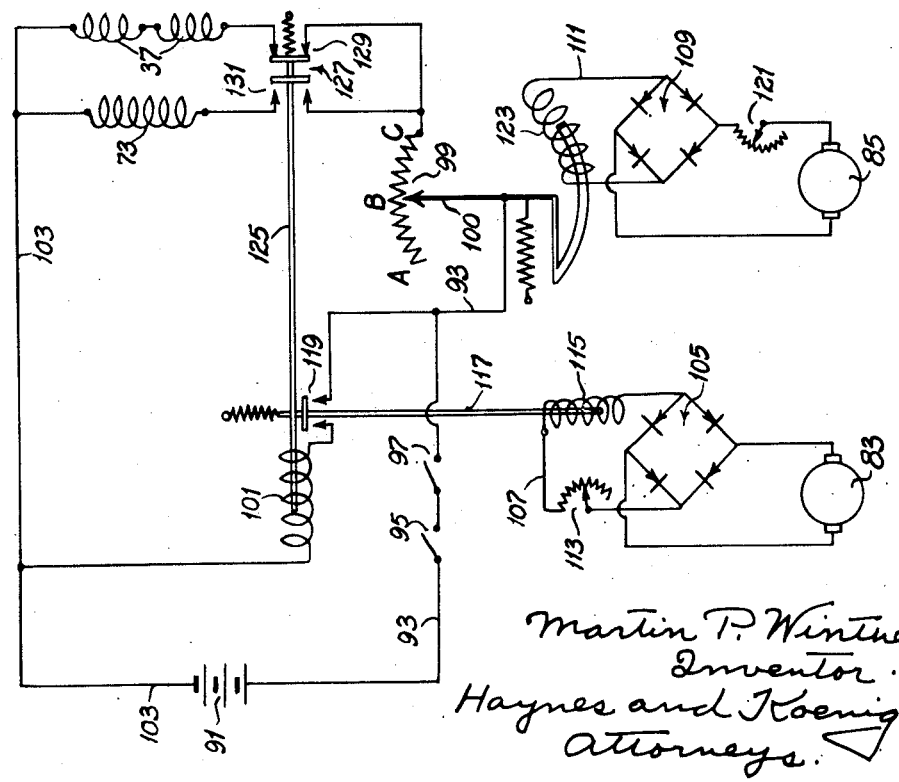
Fig. 2 is a wiring diagram for the form of the invention shown in Fig. 1.

In Fig. 2 is shown a wiring diagram for Fig. 1, assuming that this structure is to be applied to a vehicle and that the member to be driven is a compressor. Numeral 91 shows the vehicle battery which supplies a line 93 containing an ignition switch 95 and a compressor switch 97. This line 93 also includes a voltage regulator 99. The line 93 is connected with three items, namely, coils 37 (themselves acting in series); the coil 73; and a switch-operating coil 101. The return line to the battery 91 for the parallel-connected items 37, 73 and 101 is indexed 103.

The generator 83 feeds through a rectifier 105 into a D. C. circuit 107. The generator 85 feeds through a rectifier 109 into a D. C. circuit 111. The voltages in the D. C. circuits 107 and 111 are functions of the speeds of the generators 83 and 85, respectively.

In the circuit 107 is an adjustable variable resistance 113 for adjusting the voltage. There is also included a coil 115 for operating the armature 117 of a switch 119, the latter being in series with the coil 101. The coil 101 operates the armature 125 of a double-pole double-throw switch 127. One element 129 of this switch controls the excitation of coils 37. The other element 131 controls the excitation of coil 73. Switch 119 is normally open, as is also switch component 131. The switch component 129 is normally closed.

In the output circuit of the generator 85 is an adjustable variable resistance 121, whereby the voltage is controlled in the D. C. circuit 111. The latter includes a coil 123 for controlling the regulator 99.

Three positions A, B and C are diagrammatically indicated for the control arm 100 of voltage regulator 99. It has other intermediate positions, but these are of particular explanatory interest. In position A the minimum current flows (for example, 2 amperes) and in position C the maximum current flows (for example, 16.5 amperes). In the intermediate position B, assume 8.25 amperes to flow. The number of turns and resistance values in the coils 37 are designed so that when the maximum current of 16.5 amps. passes through the regulator 99 in position C, the retarder brake (of which inductor 27 is a part) retards most effectively, that is, the maximum amount. As will be shown, this corresponds to an overdrive effect between shafts D and R, of the value of about 1 to 2.4. At lower current values the retarder brake slips until at position B of the regulator 99 there is maximum slip of this brake. This corresponds to about 8.25 amps. of partial excitation through the coils 37. It also corresponds to minimum overdrive effect as will appear.

The slip coupling coil 73 has a number of turns and a resistance such that 8.25 amps. flowing provides for maximum coupling effect, which is close to a 1 to 1 speed ratio between the shafts D and R, or substantially a direct drive. At position A of the regulator 99, only 2 amps. or so of current are flowing in the coil 73, providing for maximum slip in the coupling including the inductor 65.

Operation of the form of the invention shown in Figs. 1 and 2 is as follows, assuming switches 95 and 97 to be closed:

When the vehicle engine is inoperative, the retarder brake coils 37, through the normally closed switch component 129, are energized the maximum amount from battery 91, regulator 99 being at its position C. Since the switch 119 is normally open, the switch component 131 will be normally open and the slip coupling coil 73 deenergized.

Assume next that the driving engine is started.

It drives the shaft D. The latter in turn drives the epicyclic cage 17. The planetary gears 45 roll inside of the annular gear 43. Since they also mesh with the central pinion 51, they drive the latter, the annular gear 43 acting as a fulcrum. As long as the retarder brake coils 37 have maximum excitation, there is a strong resistance against rotation of the inductor drum 27. Since the latter is attached to the annular gear 43, there is a strong resistance against movement of the fulcrum constituted by this gear. The result is an epicyclic or planetary drive from the drive shaft D through the epicyclic cage 17, relatively stationary internal gear 43 (operating as a fulcrum), cycling planet gears 45, pinion 51 to the driven shaft R. The electromagnetic induction in the inductor drum 27 cannot occur at zero speed in the latter and therefore the annular gear 43 is not held absolutely stationary. However, a retarder brake of this nature at maximum excitation of the coils 37 has such a tight electromagnetic coupling effect that the speed of the inductor drum 27 and consequently of the internal gear 43 can be held to very low values.

Since the epicyclic or planetary gear train described is one which steps up the speed between the driving shaft D and the driven shaft R, there will be the effect of an overdrive. The design of the epicyclic gear train, for example, is such that if the annular gear 43 were assumed to be stationary, there would be a speed step-up ratio of 1.0 for the drive shaft D to 2.4 of the driven shaft R. With the inherent slip of the drum 27 and gear 43 this ratio would be slightly less even at full excitation.

Thus it will be seen that at relatively low engine speeds the compressor which is driven by the shaft R may be driven at or near its normal operating speed. The voltage regulator 99 under influence from the voltage of the output generator 85 serves as a modulator of the current through the now connected retarder brake coils 37. The higher the speed of the shaft R and generator 85, the greater will be the current in circuit 111 and the more regulator 99 will insert resistance. Thus the modulation is in the direction of current reduction in the retarder brake coils 37 as the speed of the output shaft R (with generator 85) tends to rise. Thus more slip occurs in the retarder brake drum 27, and in the fulcrum gear 43 of the epicyclic gear train. This decreases the overdrive ratio. Thus the infinitely variable epicyclic gear train is adjusted for overdrive change in the direction of a lower velocity ratio, so as to compensate for any excessive speed of the shaft R.

It should be observed that the arm of the regulator 99 is a governor arm, and like all governors it hunts around an average position, but as the speed of the drive shaft D rises, the average position advances in the direction of setting B, whereby the average current flowing through the retarder brake coils 37 is reduced, thus reducing the overdrive effect. In other words, as the engine speed goes up, the average overdrive ratio decreases so as to maintain the driven shaft R close to the selected speed therefor, namely, at the best speed for the compressor or other apparatus driven thereby.

Ultimately at higher engine speeds (such as road speeds), it is desired to drive the shaft R without transmitting torque through the epicyclic gear train and at or near a 1 to 1 ratio. Hence when the engine driving shaft D reaches higher values, the voltage supplied by the input genera-tor 83 is arranged, through the relay 115, to trip shut the switch 119. An engine speed is selected for this purpose above which it is desired to have the overdrive action cut out. This energizes coil 101 to throw the switch 127, thereby opening the switch component 129 and closing the switch component 131. This at once deenergizes the retarder brake coils 37 and energizes the slip coupling coil 73. At this time the arm of the regulator 99 is oscillating about a position near B which provides for less than full excitation of coils 37 but at or near full excitation of coil 73. The result is instantaneous release of the retarder and effectuation of a tight electromagnetic coupling at the inductor 65 with a near 1 to 1 or near direct drive between the shafts D and R. If now the shaft D tends to overrun the shaft R, the arm of the regulator 99 will tend to oscillate about mean positions approaching point A. This approach will increase with increased speed deviation of the shaft D. Hence the coil 73 will be increasingly deprived of current, thus increasing the slip in the slip coupling and preventing the speed of the shaft R from exceeding its predetermined value. In other words, the average slip through the slip coupling increases with increased difference between the speeds of shafts D and R. Thus overspeeding is prevented.

The reason for not completely deenergizing the retarder at the regulator 99 prior to energizing the slip coupling is to prevent the device from dropping its load during transfer from overdrive to direct drive.

In Fig. 3 is shown an alternative form of the invention in which there is substituted for the slip coupling an overrunning clutch. In Fig. 3 the drive shaft is shown at DD and the driven shaft at RR, these being coupled to apparatus under conditions like those specified in respect to shafts D and R in Fig. 1. Hereinafter, in order to indicate similarity of parts and their functions as between Figs. 1 and 2 (so far as is possible), reference characters will be employed in Fig. 2 which are two hundred digits higher than those employed in Fig. 1. Hence, the last two digits of each of these characters will be identical to the digits of corresponding parts in Fig. 1.

The case in general is shown at 201. It has a left-hand end bell 203 wherein is a bearing 213 for supporting the shaft DD. At 283 is the generator, the stator of which is carried on the member 203 and the rotor of which is carried on the shaft DD. Included with the generator mount is a set of fan blades 133 for circulating air inside of the apparatus. At 207 is a magnetic cylinder forming part of the casing. This supports a fixed assembly 211, the latter carrying bearings 225. These bearings support a rotary annular assembly 223 keyed at 231 to a hub 233. Hub 233 carries radial fins 235, which in turn support the inductor ring 227. Carried in the casing 201 are retarder brake coils 237. In this case three coils are used, instead of two of them as in Fig. 1. Enveloping these coils are magnetic rings 239 with oppositely directed peripherally overlapped interdigitated polar teeth 241.

The right-hand end of shaft DD is splined at 215 to an epicyclic carrier, arm or cage 217. A pilot bearing 221 is employed between the cage and the annular assembly 223. At its other end the cage 217 is supported in a bearing 219 in the stationary member 211. The cage includes studs 247 supporting planetary gears 245 on needle bearings 249. Each planetary gear 245 meshes exteriorly with an internal gear 243 cut into the member 223. Each gear also meshes inwardly with a central pinion or sun gear 251 attached to the driven shaft RR. The right end of the shaft RR is supported in a bearing 279 in a cap 281. The shaft RR drives an A. C. generator 285, the stator of which is carried by the cap 281 and the rotor of which is on the shaft RR.

In this form of the invention, instead of the direct drive between the shafts DD and RR being through an electromagnetic slip coupling, it takes place through a one-way overrunning clutch shown generally at 135. This clutch consists in clutch rollers 137 mounted in a circular race 139 in the epicyclic cage 217. Inwardly these rollers engage peripheral wedge surfaces 141 on the shaft RR. Further description of such a clutch is unnecessary, since clutches of this type are known. The wedge surfaces are arranged so that if the shaft DD with the cage 217 (which is splined thereto) tends to overrun the shaft RR, the roller clutch 135 locks shut so that there is a 1 to 1 through drive between shaft DD and shaft RR. When the shaft RR tends to overrun the shaft DD and the attached cage 217, the clutch 135 opens or releases.

Figure 4:
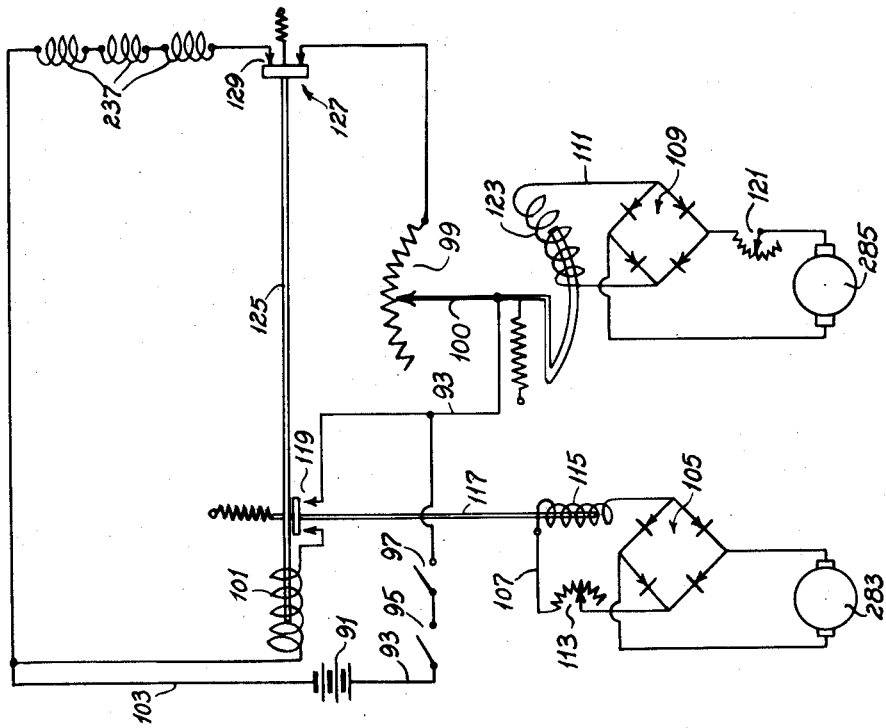
Fig. 4 is a wiring diagram for the form shown in Fig. 3.

The circuit diagram for this Fig. 3 form of the invention is shown in Fig. 4. This diagram is different from the diagram of Fig. 2 only in respect to the fact that the retarder brake coils have been renumbered 237, the generators have been renumbered 283 and 285; also the slip clutch coil 73 of Fig. 1 has been removed, along with its switch 131 component. Also, in Fig. 4, the letters A, B and C have been removed from the voltage regulator 99 because they are not required for the description of the second form of the invention. Otherwise the diagram of Fig. 4 is indexed the same as the diagram of Fig. 2 and the same description applies.

Operation of the second form of the invention, referring to Figs. 2 and 4, is as follows:

At speeds of shaft DD (engine speeds) which are low, the generator 283 generates at a low rate, leaving open the switch 119. Thus the switch element 129 is shut. Switches 95 and 97 are presumed to be shut. At a low speed of the generator 285, attached to the output shaft RR, maximum current flows through the voltage regulator 99 and to the coil 237. Thus maximum retarding brake action occurs on the inductor 227 and on the assembly 223, including its internal gear 243. Thus this gear acts as an effective fulcrum for epicyclic or planetary action from the shaft DD to the shaft RR through the planetary gears 245 and the pinion 251. This amounts to an overdrive for shaft RR, the roller clutch 135 automatically opening. The generator 285 and the regulator 99, along with the circuit elements therebetween, act as a speed governor, to maintain an average predetermined speed of the shaft RR. If under these conditions the speed of the shaft DD increases, then this governor acts to adjust the arm of the regulator toward a position to increase resistance and thus decrease current to the coil 237. As the inductor member 227 slips electromagnetically, the effective overdrive value of the epicyclic gear train decreases, thus tending to maintain desired average speed of the shaft RR.

At a predetermined speed of the drive shaft DD, the generator 283 causes the switch 119 to close, thus opening switch 129 and deenergizing the coils 237. Hence there is no resistance against rotation of the inductor 227 and the internal gear 243 does not act as a fulcrum. The result is that the epicyclic action ceases and shaft DD, with the epicyclic cage 217, tends to overrun the shaft RR. In response to this action the roller clutch 135 automatically closes to effect a direct mechanical coupling between the shafts DD and RR. Under these conditions the regulating action of the generator 285 ceases because of the open switch 129. In this form of the invention the apparatus driven by the shaft RR should be adapted to withstand higher speeds to which it may be subjected under the conditions when the roller clutch 135 is shut (retarder brake deenergized); or the driving engine and shaft DD should be incapable of damaging overspeeding in the 1 to 1 ratio. In any event this form of the invention prevents the driven apparatus from being driven at too low and ineffective a speed under low-speed operation of the shaft DD and from being oversped under overdrive conditions.

In both forms of the invention the epicyclic or planetary gear trains are taken out of operation by deenergizing the retarder brake. Under such circumstances, in the case of Fig. 1 the inductor 27 and annular member 23 swing idly at a 1 to 1 ratio with the shaft R. There is no relative motion between gears 51, 45 and 43. In the case of Fig. 3, it is the inductor drum 227 and annular assembly 223 that swing idly at a 1 to 1 ratio with the shaft RR when the coils 237 are deenergized. There is then no relative motion between gears 251, 245 and 243.

The relationships between the eddy-current inductor members and of the field members of the retarder brake and of the slip coupling may be reversed without change in principles of the invention, since machines of this class exert the same electromagnetic coupling effects whether the inductor or the field member or both move, provided there is relative motion between them.

In general, the invention has a first advantage in that the device driven from the shaft RR is not subject to low rotational speeds at low rotational speeds of the shaft DD. This is due to the overdrive through the epicyclic transmission.

Also, during the time that the epicyclic transmission is operative, speed regulation of the driven shaft is obtained by speed-responsive means effective upon the retarder brake coupling. This adjusts for the proper decreasing overdrive speed conditions through the epicyclic gear train. It should be noted in this connection that the electrical slip conditions for the retarder brake are infinitely variable and so are the mechanical drive conditions through the epicyclic train.

Another advantage of both forms of the invention is that during most of the normal running time of the apparatus, the epicyclic gear trains are taken out of action, thus prolonging their lives. As to the retarder brake and slip coupling, there is no wear whatever in the electromagnetic drag components. In the Fig. 2 form of the invention, the overrunning clutch is simple and reliable and not subject to many closing and opening operations. The result is a device which may easily be designed for hard use and long life. Furthermore, it is quite compact and light in weight.

Another advantage of the invention, so far as is concerned the Fig. 1 form, is that in addition to the speed regulation obtained during epicyclic driving action, there is also obtained speed regulation during the slip coupling drive.

It is to be understood that the terms "epicyclic" and "planetary" as used herein are synonymous. So also are the terms "cage,"

"arm" and "carrier" and the terms "brake" and "retarder."

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A variable-speed transmission comprising a driving member, a driven member, a planetary gear train connecting said members and including a gear operative as a reactive fulcrum for effecting drive through the gear train when the gear is retarded, an electromagnetic slip retarder for said gear, an over-running clutch between the driving and driven members, means responsive to speed of the driven member for variably energizing said retarder, and means responsive to a predetermined speed of the driving member for deenergizing the retarder.

2. In a variable-speed transmission a driving member, a driven member, a planetary gear train connecting said members and including a planetary arm coupled with the driving member, a sun gear coupled with the driven member, planetary gears meshing with said sun gear and carried by said arm, a gear meshing with said planetary gears and concentric with the sun gear, an electromagnetic slip retarder means coupled with the last-named gear, whereby an infinitely variable overdrive connection is obtained between the driving and driven members, an electromagnetic slip coupling having a driven element connected to the driven member and a driving element connected with said planetary arm, and means for energizing said slip coupling while deenergizing the retarder means to provide for a non-overrunning drive between the driving and driven members.

3. In a variable-speed transmission, a driving member, a driven member, a planetary gear train connecting said members and including a planetary arm coupled with the driving member, a sun gear coupled with the driven member, planetary gears meshing with said sun gear and carried by said arm, a gear meshing with said planetary gears and concentric with the sun gear, an electromagnetic slip retarder means coupled with the last-named gear, whereby an infinitely variable overdrive connection is obtained between the driving and driven members, an electromagnetic slip coupling having a driven element connected to the driven member and a driving element connected with said planetary arm, means for energizing said slip coupling to provide substantially direct drive between the driving and driven members, means responsive to a predetermined low range of speeds of the driving member for deenergizing the coupling and energizing the retarder, and means responsive to a predetermined higher speed range of the driving member for energizing the coupling and deenergizing the retarder.

4. In a variable-speed transmission, a driving member, a driven member, a planetary gear train connecting said members and including a planetary arm coupled with the driving member, a sun gear coupled with the driven member, planetary gears meshing with said sun gear and carried by said arm, a gear meshing with said planetary gears and concentric with the sun gear, an electromagnetic slip retarder means coupled with the last-named gear, whereby an infinitely variable overdrive connection is obtained between the driving and driven members, an electromagnetic slip coupling having a driven element connected to the driven member and a driving element connected with said planetary arm, means for energizing said slip coupling to provide substantially direct drive between the driving and driven members, means responsive to a predetermined low range of speeds of the driving member for deenergizing the coupling and energizing the retarder, means responsive to a predetermined higher speed range of the driving member for energizing the coupling and deenergizing the retarder, and means responsive to the speed of the driven member for modulating either the retarder or the coupling depending upon which one is energized at all, the modulation being such as to cause increased slip in the retarder or in the slip coupling in response to over-speeding tendencies in the driven member.

5. A variable-speed transmission for use between a substantially constant-speed driven machine and a driving machine having speeds ranging from subnormal to normal values for the driven machine; comprising a driving member connected to the driving machine and a driven member connected to the driven machine, an overdriving planetary gear train connecting said driving and driven members and including a gear operative as a reactive fulcrum for effecting overrunning drive through the planetary gear train when the reactive gear is retarded, a field-controlled electromagnetic slip retarder brake for said gear, a substantially direct driving clutch means between the driving and driven members adapted automatically to become operative when the retardation of said gear decreases below a certain value, electric modulating means responsive to the speed of the driven member adapted to modulate the brake field so as to control the retarding action of said brake to maintain a substantially constant speed of said driven member under the range of speeds of the driving member which are subnormal for the driven machine, and means responsive to speed of the driving member when said speed is more nearly normal for said driven machine adapted to deenergize the brake field to release the brake whereby said fulcrum planetary gear train are rendered ineffective so that when said clutch means automatically becomes operative substantially direct drive occurs from the driving to the driven member.

6. Apparatus made according to claim 5, wherein said clutch means is of the electromagnetic slip type, said means responsive to the speed of the driving member being adapted in addition to releasing the brake to energize said clutch means from said electric modulating means.

7. Apparatus made according to claim 5, wherein said clutch means is of the one-way overrunning type adapted automatically to operate to drive the driven member when the driving member tends to overrun the driven member upon brake release.

8. A variable-speed transmission comprising a driving member, a driven member, a planetary gear train connecting said members and including a gear operative as a reactive fulcrum for effecting drive through the gear train only when the gear is retarded, an electromagnetic slip retarder brake for said gear and having a coil, a gearless direct coupling between the driving and driven members adapted to be engaged when said gear is unretarded, a variable electric circuit for variably energizing said brake coil, means responsive to the speed of the driven member adapted to control the variable energization provided by said circuit to the brake coil so as to maintain a substantially constant speed of the driven member independently of certain variation in the speed of the driving member; a normally closed switch in said circuit adapted when open to deenergize said brake coil, and means responsive to speed of the driving member adapted to open said switch at a predetermined speed of the driving member.

9. A variable-speed transmission comprising a driving member, a driven member, a planetary gear train connecting said members and including a gear operative as a reactive fulcrum for effecting drive through the gear train only when the gear is retarded, an electromagnetic slip retarder brake for said gear and having a field coil, an electromagnetic slip coupling between said driving and driven members having a second field coil, an electric circuit connected for selective variable energization of either of the coupling or brake coils, a selector switch in said circuit normally positioned to energize the brake coil and to deenergize the coupling coil, means responsive to a certain speed of the driving member adapted to move the switch to deenergize the brake coil and energize the coupling coil, and means responsive to the speed of the driven member adapted to control said circuit to modulate either the brake or the coupling coil action depending upon which is connected by the selector switch.

10. A variable-speed transmission comprising a driving member, a driven member, an overdriving planetary gear train connecting said members and including a gear operative as a reactive fulcrum for effecting drive through the gear train only when the gear is retarded, an electromagnetic slip retarder brake for said gear and having a coil, a gearless direct coupling between the driving and driven members adapted to be engaged when said gear is unretarded, a variable electric circuit for variably energizing said brake coil, means responsive to the speed of the driven member adapted to control the variable energization provided by said circuit to the brake coil so as to maintain a substantially constant speed of the driven member independently of certain variation in speed of the driving member, a normally closed switch in said circuit adapted when open to deenergize said brake coil, and means responsive to speed of the driving member adapted to open said switch at a predetermined excess speed of the driving member.

11. A variable-speed transmission comprising a driving member, a driven member, an overdriving planetary gear train connecting said members and including a gear operative as a reactive fulcrum for effecting drive through the gear train only when said gear is retarded, an electromagnetic slip retarder brake for said gear and having a field coil, an electromagnetic slip coupling between said driving and driven members having a second field coil, an electric circuit connected for selective variable energization of the coupling and brake coils, a selector switch in said circuit normally positioned to energize the brake coil and to cut off the coupling coil, means responsive to excess speed of the driving member adapted to move the switch to deenergize the brake coil and to cut in the coupling coil for energization, and means responsive to the speed of the driven member adapted to control said circuit to modulate the energization of either the brake or the coupling coil depending upon which is connected by said selector switch.

MARTIN P. WINTHER.

REFERENCES CITED

The following references are of record in the file of this patent:

UNITED STATES PATENTS

| Number | Name | Date |
|---|---|---|
| 1,949,203 | Havill | Feb. 27, 1934 |
| 2,170,460 | Murray | Aug. 22, 1939 |
| 2,180,474 | Leece | Nov. 21, 1939 |
| 2,200,890 | Murray | May 14, 1940 |
| 2,258,005 | Durdin | Oct. 7, 1941 |
| 2,343,291 | Gilfillian et al. | Mar. 7, 1944 |
| 2,375,785 | Goode et al. | May 15, 1945 |

FOREIGN PATENTS

| Number | Country | Date |
|---|---|---|
| 472,953 | Great Britain | Oct. 4, 1937 |
| 618,950 | France | Mar. 23, 1927 |